United States Patent
Noda et al.

(10) Patent No.: US 7,268,457 B2
(45) Date of Patent: Sep. 11, 2007

(54) INSULATOR, ARMATURE AND ROTARY ELECTRIC MACHINE

(75) Inventors: Takeo Noda, Hamana-gun (JP); Shouichi Yoshikawa, Hoi-gun (JP); Yousuke Natsume, Toyohashi (JP); Osamu Kubota, Kosai (JP); Shigeo Nishio, Toyohashi (JP)

(73) Assignee: ASMO Co., Ltd., Shizuoka-pref. (JP)

( * ) Notice: Subject to any disclaimer, the term of this patent is extended or adjusted under 35 U.S.C. 154(b) by 98 days.

(21) Appl. No.: 10/538,179

(22) PCT Filed: Dec. 9, 2003

(86) PCT No.: PCT/JP03/15752

§ 371 (c)(1),
(2), (4) Date: Jun. 9, 2005

(87) PCT Pub. No.: WO2004/054070

PCT Pub. Date: Jun. 24, 2004

(65) Prior Publication Data

US 2006/0138893 A1 Jun. 29, 2006

(30) Foreign Application Priority Data

Dec. 11, 2002 (JP) .............................. 2002-359865

(51) Int. Cl.
*H02K 3/34* (2006.01)
(52) U.S. Cl. .................................................. 310/215
(58) Field of Classification Search .................. 310/43, 310/85, 195, 215
See application file for complete search history.

(56) References Cited

U.S. PATENT DOCUMENTS

| 4,818,911 A | * | 4/1989 | Taguchi et al. ............. 310/259 |
| 6,333,576 B1 | * | 12/2001 | Ishikawa et al. .............. 310/85 |
| 6,580,193 B2 | * | 6/2003 | Yoshikawa et al. ......... 310/215 |

FOREIGN PATENT DOCUMENTS

| DE | 4403820 A1 | 4/1995 |
| FR | 2778283 A | 11/1999 |
| GB | 1 496 176 | 12/1977 |
| JP | A-51-089102 | 8/1976 |
| JP | A-55-012760 | 1/1980 |
| JP | A-55-166472 | 12/1980 |
| JP | A-07-245896 | 9/1995 |
| JP | A-08-103043 | 4/1996 |
| JP | A-2001-286085 | 10/2001 |
| JP | A-2002-272045 | 9/2002 |
| JP | A-2002-291210 | 10/2002 |

* cited by examiner

*Primary Examiner*—Tran Nguyen
(74) *Attorney, Agent, or Firm*—Posz Law Group, PLC (57) ABSTRACT

The present invention relates to an insulator to be disposed in an armature core having a plurality of radially-formed salient poles. The insulator comprises a winding aligning portion having an approximately V shape (forming an angle of 60 degrees) and getting narrower from an outer side to an inner side in a radial direction of the armature core approximately at the middle between the salient poles to position a winding disposed at a first layer which is a most inner side in the radial direction of the armature core approximately at a middle between the salient poles. By this structure, it is possible to align the windings on the second layer and beyond, thereby preventing a dig-in and the like of the windings and hence preventing faulty insulation between the windings.

4 Claims, 7 Drawing Sheets

INSULATOR, ARMATURE AND ROTARY ELECTRIC MACHINE

TECHNICAL FIELD

The present invention relates to an insulator, an armature and a rotary electric machine, and especially relates to the insulator, the armature and the rotary electric machine suitable for a vehicular air blower.

BACKGROUND ARTS

Conventional vehicular air blower incorporates a rotary electric machine to rotate a fan. The rotary electric machine has an armature including a stack-type armature core and windings wound on the armature core. The above-described armature is provided with an insulator on a surface of the armature core to insulate the armature core from the windings (refer to JP-2002-272045-A (Pgs. 4 through 6, FIG. 2) and JP-07-245896-A (Pgs. 4 through 6, FIG. 1) for example).

Figure 11:
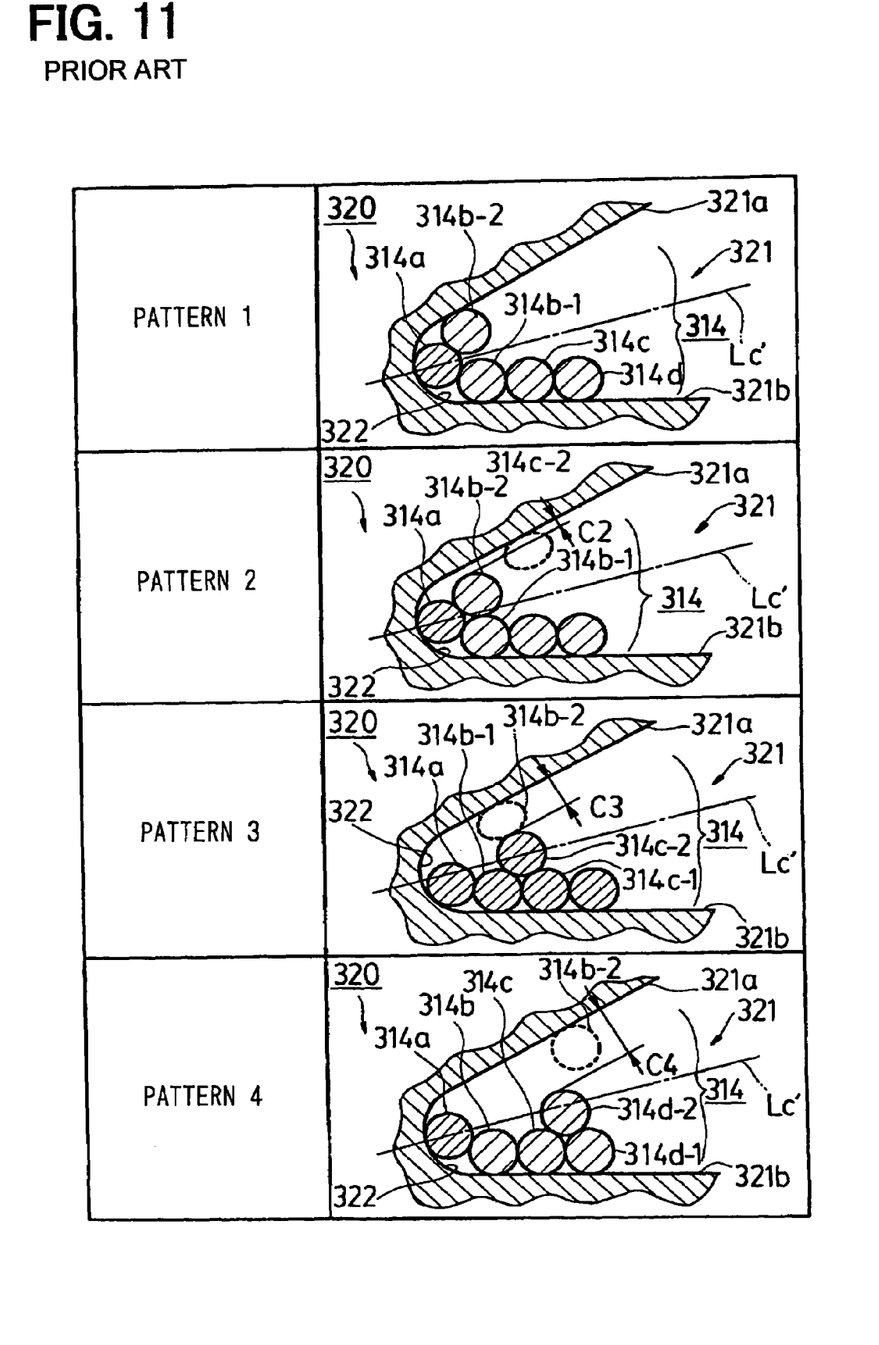
FIG. 11 is an explanatory diagram showing winding patterns in using a conventional insulator.

However, the above-described conventional insulator has the following disadvantages. FIG. 11 is an explanatory diagram showing the disadvantages of the conventional insulator, and depicts winding patterns of the winding wound on the conventional insulator in varied winding patterns.

In the respective winding patterns in FIG. 11, a reference numeral 320 denotes a conventional insulator disposed in an armature core having a plurality of radially-formed salient poles. The insulator 320 has slots 321 formed at regular intervals. Further, the slot 321 has an arc portion 322 at an inner portion in a radial direction of the insulator 320. Multi-layered windings 314 are wound in distributed winding method and disposed in the slot 321.

In a winding pattern 1, a winding 314a on a first layer is wound to be in contact with an arc portion 322 on a center axis Lc' of the slot 321. Then, windings 314b-1, 314b-2 on a second layer are wound to be in tight contacts with inner walls 321a, 321b of the slot 321 and the winding 314a on the first layer. In this case, windings 314c, 314d of a third layer and beyond are aligned regularly.

In a winding pattern 2, the winding 314a on the first layer is wound to be in contact with the arc portion 322 on the center axis Lc' of the slot 321. Then, the first winding 314b-1 on the second layer is wound to be in tight contacts with the inner wall 321b of the slot 321 and the winding 314a on the first layer. Further, the second winding 314b-2 is wound to be in tight contacts with the winding 314a on the first layer and the first winding 314b-1 on the second layer. In this case, the second winding 314b-2 on the second layer and the inner wall 321a of the slot 321 form a clearance C2 therebetween. However, a width of the clearance C2 is smaller than a diameter of a second winding 314c-2 on the third layer when it is deformed, so that the winding 314c-2 do not enter in the clearance C2.

In a winding pattern 4, the winding 314a on the first layer is wound to be in contact with the arc portion 322 on the center axis Lc' of the slot 321. Then, one winding 314b on the second layer and one winding 314c on the third layer are wound. Further, a second winding 314d-2 on the fourth layer is wound to be in tight contact with the winding 314c on the third layer and the first winding 314d-1 on the fourth layer. In this case, the second winding 314d-2 on the fourth layer and the inner wall 321a of the slot 321 form a clearance C4 therebetween. However, the width of the clearance C4 is larger than a diameter of the second winding 314b-2 on the second layer in its natural state, so that the winding 314b-2 does not dig into the clearance C4.

In a winding pattern 3, the winding 314a on the first layer is wound to be in contact with the arc portion 322 at a position diverted from the center axis Lc' of the slot 321. Then, the second winding 314c-2 on the third layer is wound to be in tight contacts with the winding 314b-1 on the second layer and the first winding 314c-1 on the third layer. In this case, the second winding 314c-2 on the third layer and the inner wall 321a of the slot 321 form a clearance C3 therebetween. The width of the clearance C3 is larger than a diameter of the second winding 314b-2 on the second layer when it is deformed, so that the winding 314b-2 may dig into the clearance C3.

In short, the armature incorporating the insulator 320 having the above-described structure has a disadvantage that the windings 314 is not regularly wound in the slot 321 if the winding 314a on the first layer is wound in contact with the arc portion 322 at a position diverted from the center axis Lc'.

Thus, if the winding 314 is not regularly wound in the slot 321, the windings 314 may dig to be damaged as described above. Especially as in the winding pattern 3, the winding 314b-2 dug in the clearance C3 is pressed radially inward by other windings wound radially outer than the winding 314b-2. Then, the winding 314b-2 is strongly pressed into the clearance C3 and an insulation of the winding 314b-2 may be spoiled.

The present invention is achieved in view of the above-described issues and has an object to provide an insulator, an armature and a rotary electric machine capable of preventing insufficient insulation of the windings.

Another object of the present invention is to provide an insulator, an armature and a rotary electric machine capable of having enough number of slots even if they are provided with a configuration capable of preventing insufficient insulation of the windings.

A still another object of the present invention is to provide a rotary electric machine capable of improving its durability relative to conventional ones.

DISCLOSURE OF THE INVENTION

An insulator according to a first embodiment is an insulator disposed in an armature core formed such that a plurality of salient poles are radially disposed. The insulator is formed to position a winding on a first layer that is disposed at most inner side in a radial direction of the armature core among the windings wound on the salient poles approximately at a middle between the salient poles.

By forming the insulator to position a winding on a first layer that is disposed at most inner side in a radial direction of the armature core among the windings wound on the salient poles approximately at a middle between the salient poles, it is possible to wind the windings on the second and subsequent layers to be regularly aligned state. Thus, it is possible to prevent the windings from being bitten and from insufficient insulation.

More specifically, the insulator according to the first invention is formed to have an approximately V-shaped winding aligning portion that gets narrower from an outer side to an inner side in the radial direction of the armature core approximately at the middle between the salient poles. Thus, it is possible to position the winding on the first layer approximately at the middle between the salient poles just by putting the winding on the first layer in the winding aligning portion.

It is desirable that the approximately V-shaped winding aligning portion is formed so that two slant faces meet at an angle from approximately 45 degrees through approximately 75 degrees. Further, it is desirable that the winding aligning portion is formed to be able to align the windings on at least two layers at the most inner side in the radial direction of the armature core. Still further, it is desirable that the winding aligning portion is formed to be able to align the windings of which diameters are approximately 0.9 mm.

It is desirable to form a center angle of the slot in the insulator larger than the angle at which the two slant faces meet in the winding aligning portion in cases a number of the slots of the insulator is smaller than or equal to six, and to form smaller than the angle at which the two slant faces meets in the winding aligning portion in cases the number of the slots of the insulator is larger than six, so that the angle at which the two slant faces meets in the winding aligning portion does not limit the number of the slots. Thus, it is possible to provide a sufficient number of the slots even if the insulator is formed to prevent the winding from insufficient insulation.

In the insulator according to the first invention, it is the most desirable that the two slant faces meet approximately at 60 degrees in the winding aligning portion. Thus, it is possible to align the windings on the second and subsequent layers symmetrically with respect to a center axis of the winding aligning portion.

An armature according to a second invention is provided with the above-described insulator, so that the armature can prevent the windings from insufficient insulation.

A rotary electric machine according to a third invention is provided with the armature according to the second invention, so that the machine can prevent the windings from insufficient insulation and have a improved durability relative to conventional ones.

BEST MODE FOR CARRYING OUT THE INVENTION

In the following, an embodiment of the present embodiment will be described with reference to the drawings. In the following description, components, arrangements and so on do not limit a scope of the present invention, and they can be modified in accordance with the spirit of the present invention.

Figure 1:
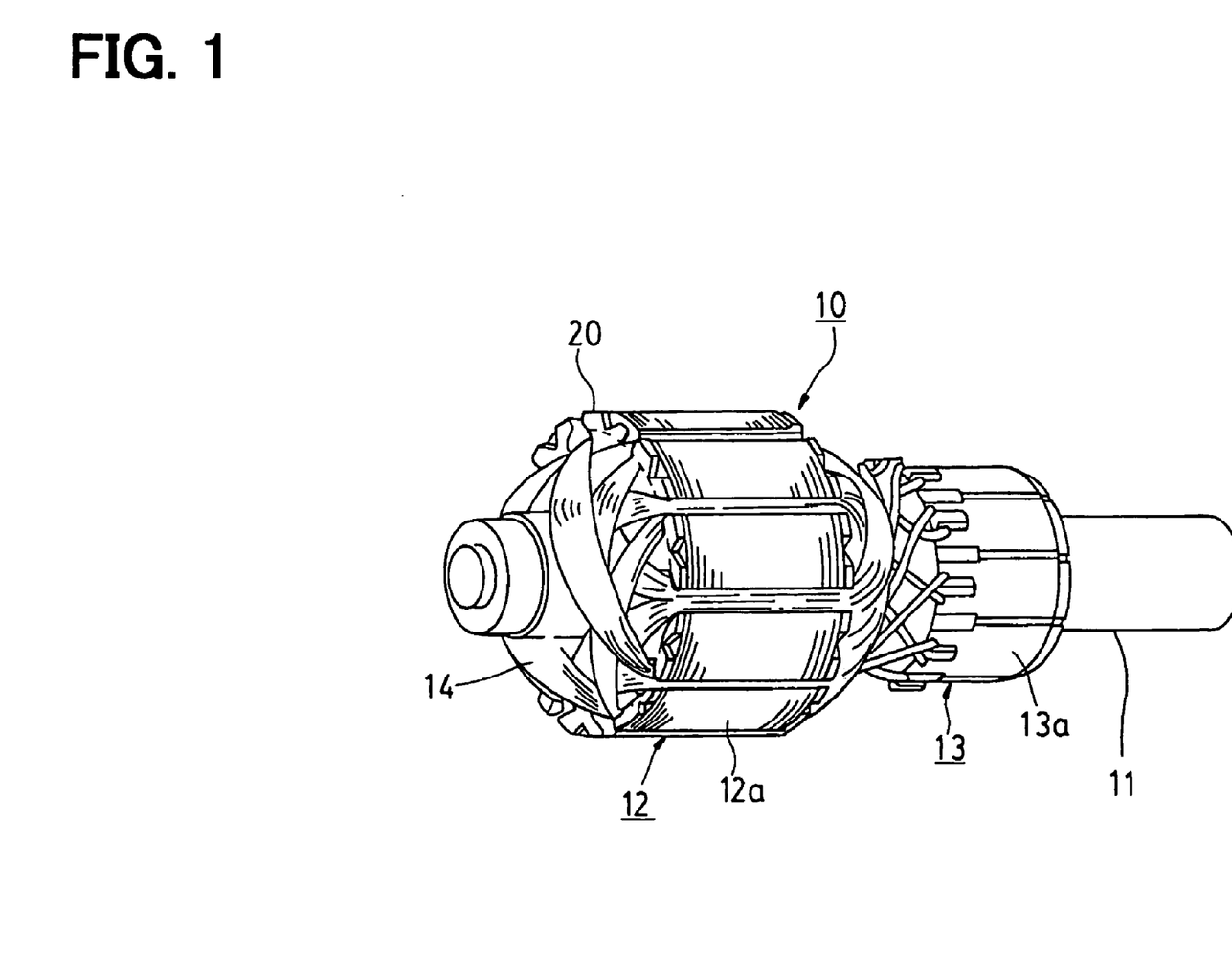
FIG. 1 is a perspective view showing a structure of an armature incorporating an insulator according to an embodiment of the present invention.
Figure 2:
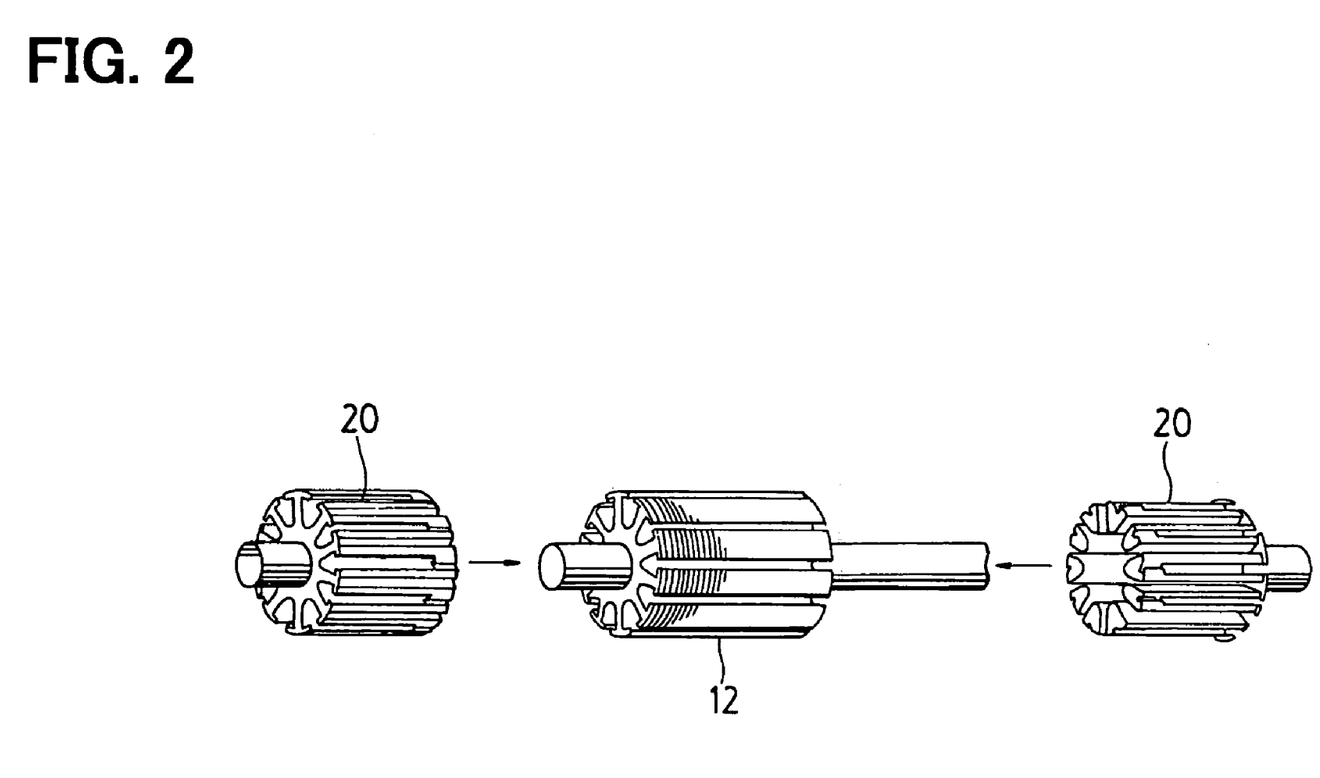
FIG. 2 is an exploded perspective view of the armature incorporating the insulator according to the embodiment of the present invention.
Figure 3:
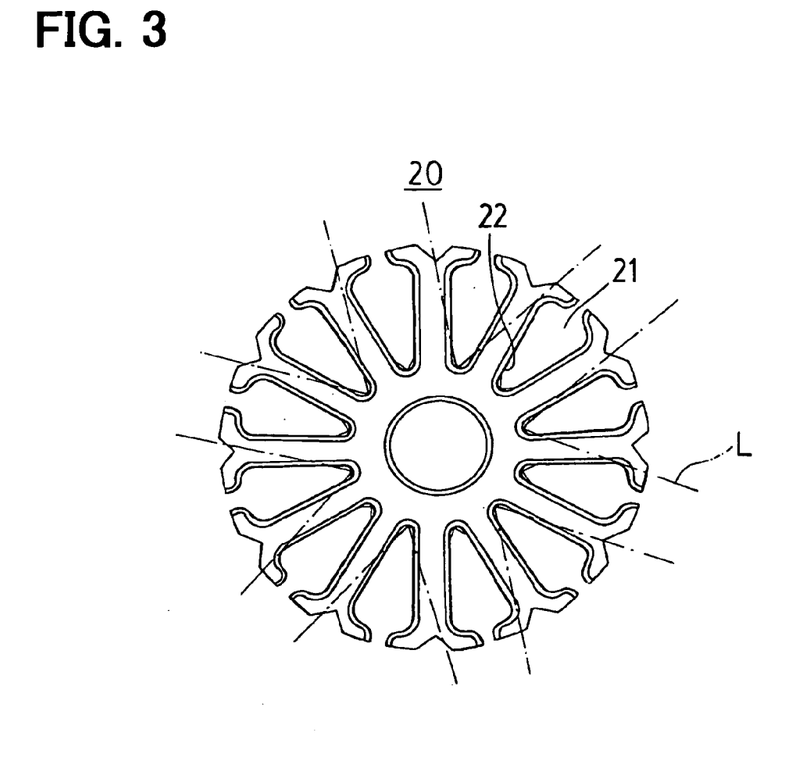
FIG. 3 is a front view of the insulator according to the embodiment of the present invention.
Figure 4:
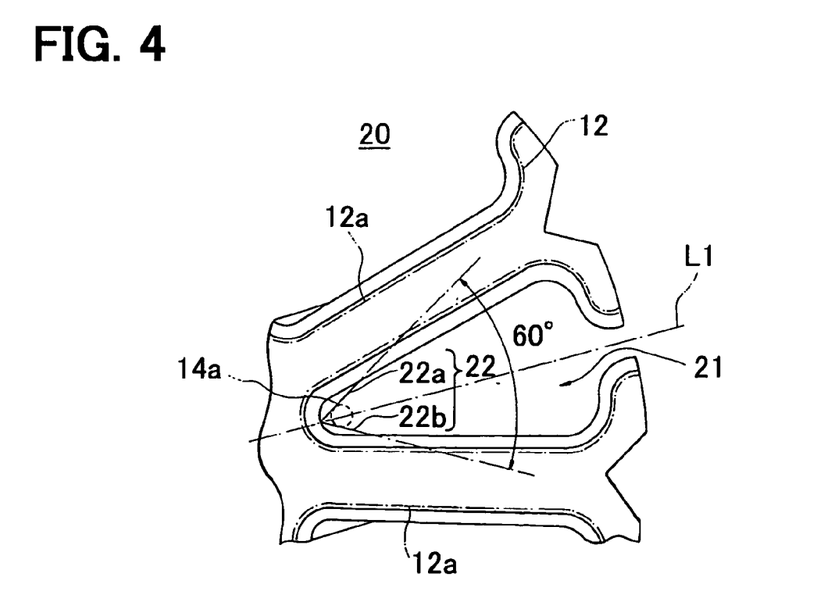
FIG. 4 is an enlarged view of a principal portion of the insulator according to the embodiment of the present invention.
Figure 5:
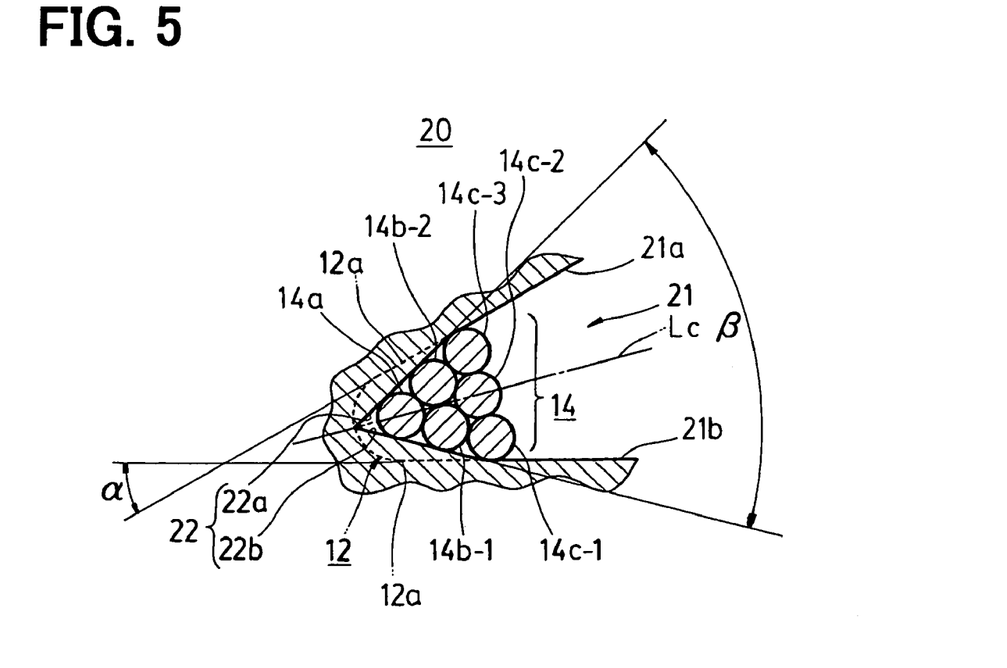
FIG. 5 is an explanatory diagram showing an aligning state of windings by a winding aligning portion according to the embodiment of the present invention.
Figure 6:
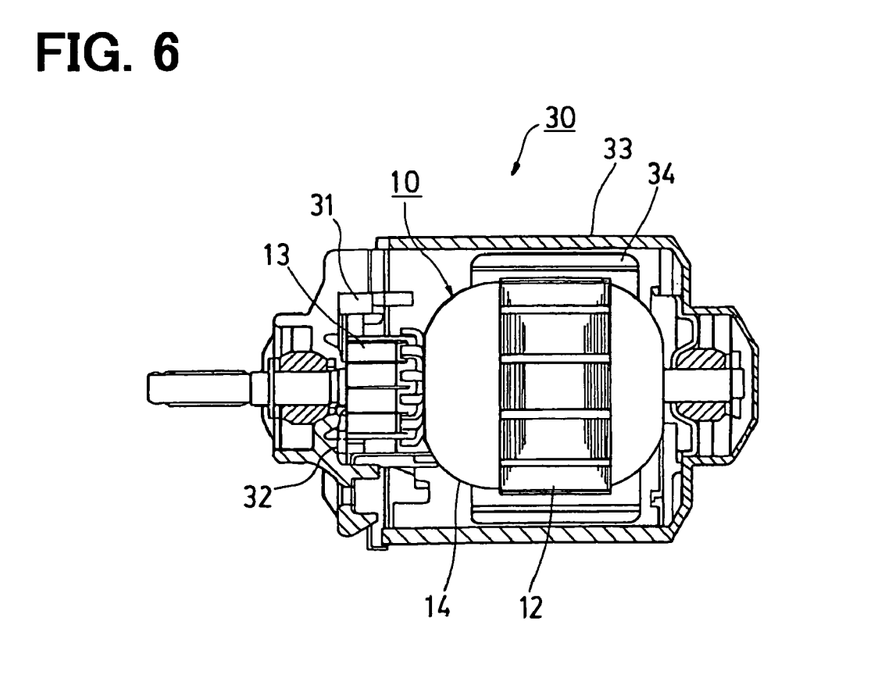
FIG. 6 is a cross-sectional and side view showing a structure of a rotary electric machine according to the embodiment of the present invention.

FIGS. 1 to 6 depict an embodiment of the present invention. FIG. 1 is a perspective view showing a structure of an armature incorporating an insulator. FIG. 2 is an exploded perspective view of the armature incorporating the insulator. FIG. 3 is a front view of the insulator. FIG. 4 is an enlarged view of a principal portion of the insulator. FIG. 5 is an explanatory diagram showing an aligning state of the windings by a winding aligning portion. FIG. 6 is a cross-sectional and side view showing a structure of a rotary electric machine. In FIG. 4, the insulator 40 is shown to be seen from an opposite side to the communicator 13 in FIG. 1.

The reference numeral 10 in FIG. 1 denotes the armature incorporating the insulator according to the embodiment of the present invention. The armature 10 is disposed in a DC rotary electric machine for a vehicular air blower, for example.

The armature 10 is provided with a rotation shaft 11. The rotation shaft 11 is provided with a stack-type armature core 12 having a plurality of salient poles 12a and a commutator 13. Each segment 13a of the commutator 13 is connected to a winding 14, which is wound on a plurality of salient poles 12a respectively on a plurality of layers by distribution winding method. Here, a diameter of the winding 14 is approximately 0.9 mm.

The armature core 12 is provided with insulators 20 made of electrical insulating material to secure insulation between the windings 14 and the armature core 12. As shown in FIG. 2, the insulators 20 are formed in a shape approximately similar to the armature core 12 and slightly larger than an outer shape of the armature core 12. A pair of the insulators 20 are disposed on an axial direction of the armature core 12 to interpose the armature core 12 therebetween and are fixed to the armature core 12.

As shown in FIG. 3, the insulator 20 has a plurality of slots 21 between the salient poles 12a of the armature core 12 shown in FIG. 1. Many layers of the windings are inserted and disposed in the slot 21. The winding aligning portion 22 is formed in each the slot 21 at an inner portion in a radial direction of the insulator 20. As shown in FIG. 4, the winding aligning portion 22 has an approximately V shape formed by two slant faces 22a, 22b connected at an inner portion in the radial direction of the insulator 20 so as to get narrower from an outer side to an inner side in the radial direction of the armature core 12.

The approximately V-shaped winding aligning portion 22 is formed so that an axis L1 of symmetry thereof is disposed approximately at a middle between the salient poles 12a and that the two slant faces 22a, 22b forming the winding aligning portion 22 meet at 60 degrees. Further, as shown in FIG. 5, the winding aligning portion 22 according to the present embodiment is formed to be able to align the windings 14 of at least two layers at most inner position in the radial direction. Thus, by forming the winding aligning portion 22 configured as described above in the slot 21, the winding 14*a* on the first layer can be securely positioned in a midsection of the salient poles 12*a* just by inserting the winding 14*a* on the first layer in the winding aligning portion 22. Further, by the winding aligning portion 22, it is possible to align the windings 14*b*-1, 14*b*-2, 14*c*-1, 14*c*-2 and 14*c*-3 on the second layer and further layer symmetrically with respect to the center axis Lc of the winding aligning portion 22. Thus, is possible to wind the windings 14 to be aligned.

Winding state of the windings 14 in the slot 21 having the winding aligning portion 22 will be described in detail in the followings. That is, the winding 14*a* connected to the commutator 13 (refer to FIG. 1) is inserted in the slot 21 and positioned on a center axis Lc of the slot 21 as the winding on the first layer to be in line with the slant faces 22*a*, 22*b* of the winding aligning portion 22. Further, the winding 14*b*-1 inserted in the slot 21 as a first winding on the second layer is wound to be in tight contacts with the winding 14*a* on the first layer and with the slant face 22*b*. The winding 14*b*-2 inserted in the slot 21 as a second winding on the second layer is wound to be in tight contacts with the windings 14*a*, 14*b*-1 and the slant face 22*a*.

Still further, the winding 14*c*-1 inserted in the slot 21 as a first winding on the third layer is wound to be in tight contact with the winding 14*b*-1 and the inner wall 21*b* of the slot 21. The winding 14*c*-2 inserted in the slot 21 as a second winding on the third layer is wound to be in tight contacts with the windings 14*b*-1, 14*b*-2, 14*c*-1 and positioned on the center axis Lc of the slot 21. The winding 14*c*-3 inserted in the slot 21 as a third winding on the third layer is wound to be in tight contacts with windings 14*b*-2, 14*c*-2 and the inner wall 21*a* of the slot 21.

Thus, the winding aligning portion 22 positions the winding 14*a* on the first layer on the center of the slot 21, so that the windings 14*b*-1, 14*b*-2, 14*c*-1, 14*c*-2, 14*c*-3 are wound to be regularly aligned in the slot 21.

As described above, by adopting the insulator 20 according to the present embodiment, it is possible to wind the windings 14 regularly in an aligned manner, thereby preventing dig-in and the like of the windings 14. Thus, the windings 14 are prevented from faulty insulation.

As shown in FIG. 5, the insulator 20 according to the present embodiment is formed so that an center angle α of the slot 21 (30 degrees in the present embodiment) is smaller than an angle β (referred to as center angle β in the following; 60 degrees in the present embodiment) at which the two slant faces 22*a*, 22*b* meet in the winding aligning portion 22. By forming the insulator 20 as described above, the center angle β of the winding aligning portion 22 does not limit the number of the slots 21. That is, in a case that the center angle β of the slot 21 is formed equal to the center angle β of the winding aligning portion 22, the number of the slots (that is, the number of the salient poles of the armature core) are excessively limited. As shown in FIG. 3 for example, in a case that the rotary electric machine should be provided with twelve slots, if the center angle of the slot 21 is set to 60 degrees equal to the center angle of the winding aligning portion 22, only six slots are formed as shown by additional lines L.

However, in the insulator 20 according to the present embodiment, as shown in FIG. 5, the center angle α of the slot 21 is formed smaller than the center angle β of the winding aligning portion 22, so that the number of the slots does not excessively limited. Accordingly, the insulator 20 according to the present embodiment can secure enough number of the slots even if it has a structure to prevent the insufficient insulation in the windings 14.

As described above, in cases that the number of the slots 21 in the insulator 20 is larger than six, the center angle α of the slots 21 of the insulator 20 are formed smaller than the center angle β of the winding aligning portion 22. In cases that the number of the slots 21 of the insulator 20 is smaller than or equal to six, the center angle α of the slots 21 are formed larger than the center angle β of the winding aligning portion 22. By forming the insulator 20 as described above, it is prevented for the center angle β of the winding aligning portion 22 from limiting the number of the slots 21. Thus, it is possible to secure enough number of the slots 21 even if the insulator 20 has a structure to prevent the insufficient insulation in the winding 14.

Next, a rotary electric machine incorporating the above-described insulator will be described. The reference numeral 30 in FIG. 6 denotes a DC rotary electric machine used for a vehicular air blower for example.

The rotary electric machine 30 is constituted to have the above-described armature 10, a brush 31 in slide contact with the armature 10 and a brush supporting apparatus 32 supporting the brush 31 and for supplying electric power from an outer electric power source to the brush 31. The armature 10 is enclosed in a yoke housing 33. Magnet 34 is disposed on an inner circumferential face of the yoke housing 33. The rotary electric machine 30 can prevent insufficient insulation in the windings 14 by being provided with the armature 10 including the insulator 20 as described above. The rotary electric machine 30 is improved in its durability relative to conventional ones. Further, by preventing insufficient insulation in the windings 14, it is possible to prevent a disadvantage such as a sudden halt of the armature 10 during rotating operation.

As described above, the present invention has the following advantages.

As shown in FIG. 5, the insulator 20 according to the present embodiment is formed to be able to position the winding 14*a* on the first layer approximately at the middle between the salient poles 12*a* among the windings 14*a* wound on the salient poles 12*a*. Thus, it is possible to wind the windings 14*b*-1, 14*b*-2, 14*c*-1, 14*c*-2, 14*c*-3 on the second layer and beyond in a regularly aligned state. Accordingly, it is possible to prevent the windings 14 from digging and hence to prevent insufficient insulation of the windings 14.

The insulator 20 according to the present embodiment is formed to have approximately V-shaped winding aligning portion 22 getting narrower from the outer side to the inner side in the radial direction of the armature core 12 approximately at the middle between the salient poles 12*a*. Thus, it is possible to securely position the winding 14*a* on the first layer approximately at the middle between the salient poles 12*a* just by inserting the winding 14*a* on the first layer in the winding aligning portion 22.

Further, the winding aligning portion 22 is formed such that the two slant faces 22*a*, 22*b* meet approximately at 60 degrees. Thus, it is possible to align the windings 14*b*-1, 14*b*-2, 14*c*-1, 14*c*-2, 14*c*-3 on the second layer and beyond symmetrically with respect to the center axis of the winding aligning portion 22 as the axis of symmetry.

As shown in FIG. 5, in the insulator 20 according to the present embodiment, the center angle α (30 degrees in the present embodiment) of the slot 21 is formed smaller than the center angle β (60 degrees in the present embodiment) of the winding aligning portion. By forming the insulator 20 as described above, the number of the slots 21 is not limited by the center angle β of the winding aligning portion 22. Thus, the insulator 20 according to the present embodiment can secure enough number of the slots even if it has a structure capable of preventing insufficient insulation of the windings 14.

Still further, by preventing insufficient insulation in the windings 14, it is possible to prevent a disadvantage such that the sudden halt of the armature 10 during the rotational operation of the rotary electric machine 30.

The present embodiment may be modified as follows.

Figure 7:
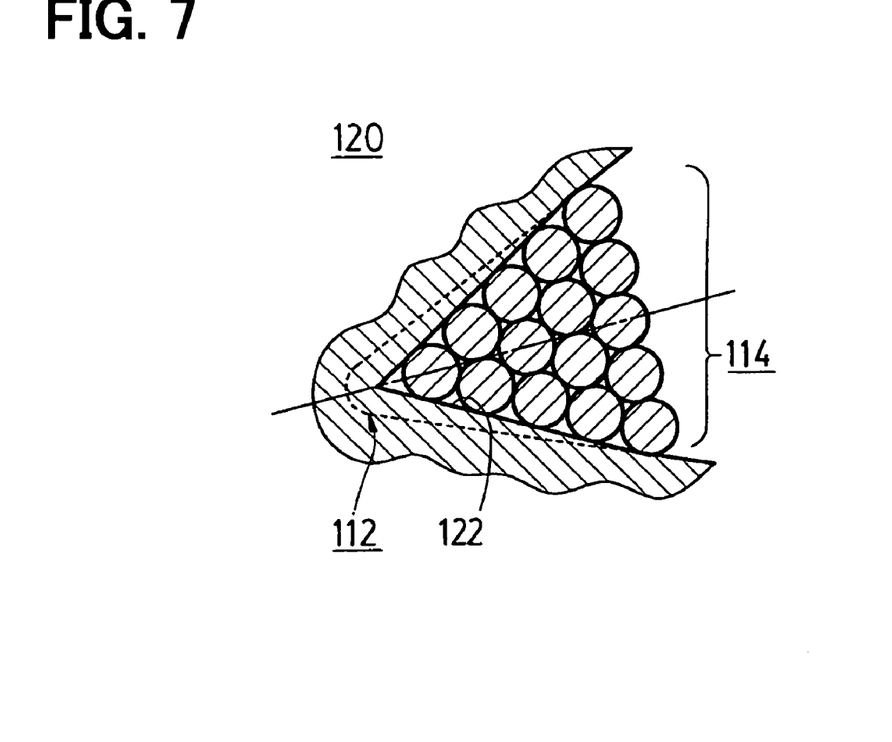
FIG. 7 is an explanatory diagram showing a winding aligning portion according to a first modified embodiment of the present invention.

(a) As shown in FIG. 5, in the above-described embodiment, the winding aligning portion 22 of the insulator 20 is described to be able to align the windings 14 on at least two layers at the most inner side in the radial direction of the armature core. The present invention, however, is not limited to this structure. For example, as an insulator 120 according to a first modified embodiment shown in FIG. 7, a winding aligning portion 122 may be formed to be able to align windings 144 of a plurality of layers at a most inner side in the radial direction of an armature core 112.

Figure 8:
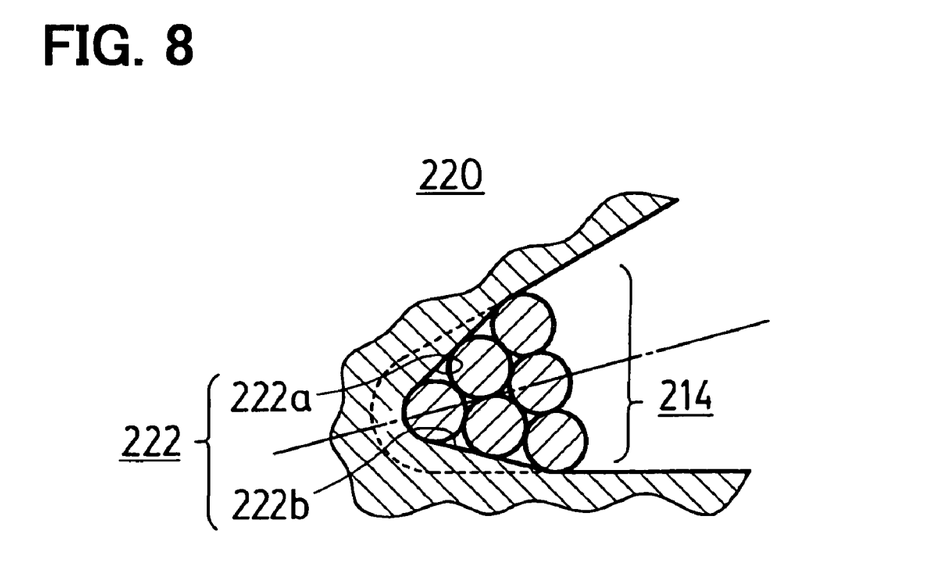
FIG. 8 is an explanatory diagram showing a winding aligning portion according to a second modified embodiment of the present invention.

(b) Further, as shown in FIG. 5, in the above-described embodiment, the winding aligning portion 22 of the insulator 20 is described such that the two slant faces 22,a 22b meet at most inner side of the insulator 20 to form a corner. The present invention, however, is not limited to this structure. For example, as an insulator 220 according to a second modified embodiment shown in FIG. 8, the winding aligning portion 222 may be formed such that two slant faces 222a, 222b meet at a radially inner portion of the insulator 220 to form a rounded connection. Here, the insulator described in the claim 2 includes in its scope of invention the insulator 220 having a shape of the winding aligning portion 222 according to the second embodiment.

(c) Still further, as shown in FIG. 6, in the above-described embodiment, the brush type DC rotary electric machine 30 and the armature 10 incorporated in the rotary electric machine 30 are described. The rotary electric machine and the armature according to the present invention, however, are not limited to these. For example, the rotary electric machine and the armature according to the present invention may be respectively a brushless motor and an armature used for the brushless motor, and also may be an AC rotary electric machine having windings and a winding used for the AC rotary electric machine.

(d) Further, as shown in FIG. 3, in the above embodiment, the number of the salient poles 12a in the armature core 12 is twelve. The armature and the rotary electric machine according to the present invention, however, are not limited to these. It is of course that the number of the salient poles can be arbitrarily determined such as six and nine for example.

Figure 9:
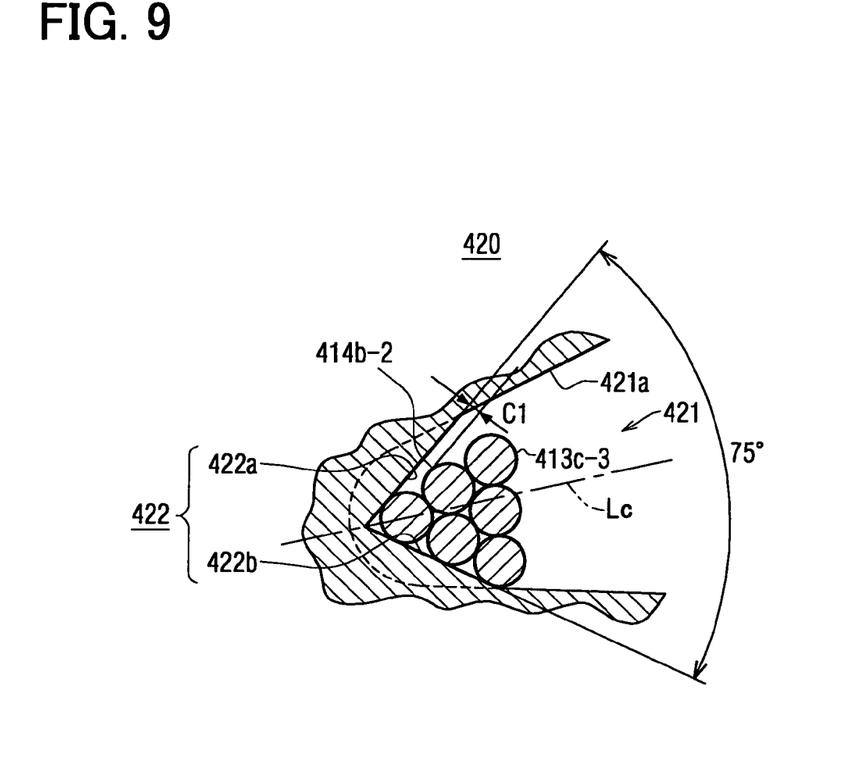
FIG. 9 is an explanatory diagram showing a winding aligning portion according to a third modified embodiment of the present invention.

(e) In the above-described embodiment, as shown in FIG. 4, the two slant faces 22a, 22b forming the winding aligning portion 22 meet at 60 degrees. The angle at which the two slant faces 22a, 22b meet is desirably 60 degrees, however, the present invention is not limited to this structure. For example, as an insulator 420 according to a third modified embodiment shown in FIG. 9, two slant faces 422a, 422b forming the winding aligning portion 422 may meet at 75 degrees. In the case that the two slant faces 422a, 422b forming the winding aligning portion 422 meet at 75 degrees, a second winding 414b-2 on the second layer and an inner wall 421a of the slot 421 form a clearance C1 therebetween. However, the clearance C1 is narrower than a diameter of a third winding 414c-3 on the third layer when it is deformed so that the winding 414c-3 does not enter in the clearance C1. Thus, even in cases that the two slant faces 422a, 422b forming the winding aligning portion 422 meet at an angle larger than 60 degrees, the winding 414c-3 is prevented from entering in the clearance C1 formed between the windings 414b-2 and the inner wall 421a of the slot 421 if an angle in excess of 60 degrees corresponds to a dimension smaller than a diameter of the winding 414c-3 when it is deformed (for example, a half of the diameter of the winding in a natural state). Accordingly, if the two slant faces 422a, 422b forming the winding aligning portion 422 meet at an angle smaller than or equal to 75 degrees (60 degrees+an angle smaller than or equal to 15 degrees), the windings 14 do not suffer insufficient insulation and the like.

Figure 10:
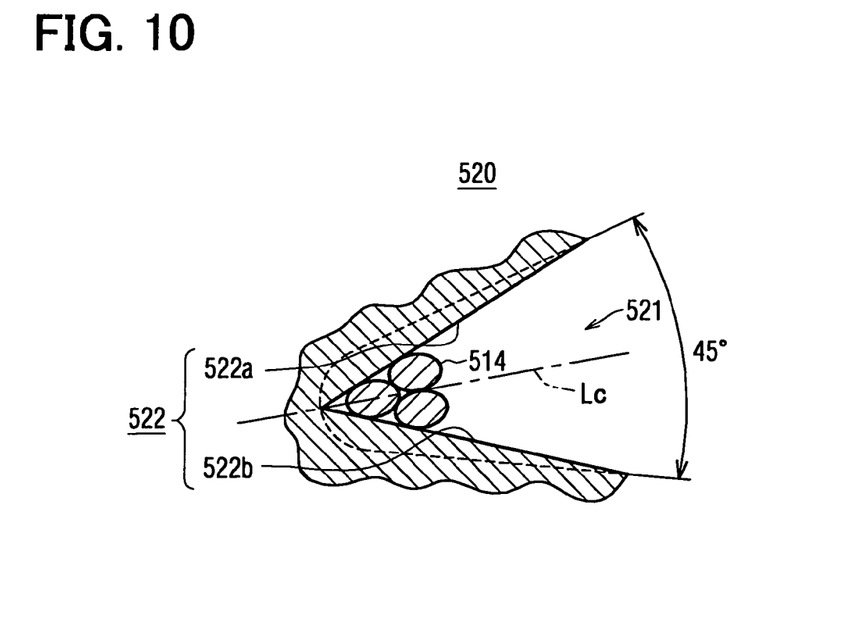
FIG. 10 is an explanatory diagram showing a winding aligning portion according to a fourth modified embodiment of the present invention.

(f) In the above-described embodiment, as shown in FIG. 4, the two slant faces 22a, 22b forming the winding aligning portion 22 meet at 60 degrees. However, as an insulator 520 according to a fourth modified embodiment shown in FIG. 10, two slant faces 522a, 522b may meet at 45 degrees. Here, in winding the winding 514 in the slot 521, the winding 514 is subjected to tensile force. If the winding 514 is subjected to tensile force, the winding 514 may be deformed. In the example shown in FIG. 10, the winding 514 is wound in the slot 521 in a deformed state by being subjected to tensile force. That is, in the fourth modified embodiment, the deformed state of the winding 514 is taken into consideration. By considering a degree of the deformation, an angle of 75% of the most desirable angle (60 degrees) is minimum. Accordingly, in this example, the angle is set to 45 degrees, which is 75% of the most desirable angle of 60 degrees in view of the deformed state of the winding 514. Thus, even in cases that the two slant faces 522a, 522b forming the winding aligning portion 522 meet at 45 degrees, it is possible to wind the windings 514 to be regularly aligned.

As described above, the winding aligning portion according to the present invention can be formed so that the two slant faces forming the winding aligning portion meet approximately between 45 degrees through 75 degrees (desirably 60 degrees) regardless of the number of the slots.

Technical thoughts conceived from the above-described embodiments and other than the claimed matter will be described in the following together with those effects.

That is, the insulator is disposed in the armature with a plurality of the radially-formed salient poles. The insulator is characterized in formed to be able to symmetrically align the windings at least on the second layer and beyond at the most inner side in the radial direction of the armature core among the windings wound on the salient poles with respect to the center axis of the slot as the axis of symmetry.

Thus, by forming the insulator to be able to symmetrically align the windings at least on the second layer and beyond at the most inner side of the armature core among the windings wound on the salient poles with respect to the center axis of the slot as the axis of symmetry, it is possible to wind the windings on the second layer and beyond in a regularly aligned state. Accordingly, it is possible to prevent the windings from digging and hence from insufficient insulation.

The invention claimed is:

1. An insulator to be disposed in an armature core having a plurality of radially-formed salient poles, wherein the insulator is formed to position a winding of a first layer, which is an innermost layer in a radial direction of the armature core, approximately at a middle between the salient poles among the windings wound on the salient poles, the insulator includes an approximately V-shaped winding aligning portion, which becomes narrower from an outer side to an inner side in the radial direction of the armature core, approximately at the middle between the salient poles, and the winding aligning portion is formed such that two slant faces thereof meet at an angle from approximately 45 degrees to approximately 75 degrees.

2. The insulator according to claim 1, the insulator further characterized in being formed to be able to align the windings of which diameters are approximately 0.9 mm.

3. The insulator according to claim 1, further characterized in that a center angle of the slot in the insulator is larger than an angle at which two slant faces of the winding aligning portion meet in cases in which a number of the slots of the insulator is smaller than or equal to six and smaller than the angle at which the two slant faces of the winding aligning portion meet in cases in which the number of the slots of the insulator is larger than six.

4. The insulator according to claim 1, further characterized in that the winding aligning portion is formed so that two slant faces meet approximately at 60 degrees.

* * * * *